(12) United States Patent
Nolan et al.

(10) Patent No.: US 9,613,133 B2
(45) Date of Patent: *Apr. 4, 2017

(54) CONTEXT BASED PASSAGE RETRIEVAL AND SCORING IN A QUESTION ANSWERING SYSTEM

(71) Applicant: International Business Machines Corporation, Armonk, NY (US)

(72) Inventors: Christopher M. Nolan, Acton, MA (US); William G. Visotski, Merrimack, NH (US); David E. Wilson, Lowell, MA (US); Robert L. Yates, Arlington, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 139 days.

This patent is subject to a terminal disclaimer.

(21) Appl. No.: 14/535,768

(22) Filed: Nov. 7, 2014

(65) Prior Publication Data

US 2016/0132589 A1    May 12, 2016

(51) Int. Cl.
*G06F 17/30* (2006.01)
*G06N 5/00* (2006.01)

(52) U.S. Cl.
CPC .... *G06F 17/30675* (2013.01); *G06F 17/3053* (2013.01); *G06F 17/30699* (2013.01); *G06F 17/30985* (2013.01); *G06N 5/00* (2013.01)

(58) Field of Classification Search
CPC ............ G06F 17/3053; G06F 17/3069; G06F 17/30477; G06F 17/30424; G06F 17/30604; G06F 17/30663; G06F 17/30442

USPC .................................................. 707/705–780
See application file for complete search history.

(56) References Cited

U.S. PATENT DOCUMENTS

| | | | | |
|---|---|---|---|---|
| 5,724,571 | A | 3/1998 | Woods | |
| 6,493,663 | B1 * | 12/2002 | Ueda | G06F 17/271 704/9 |
| 7,707,204 | B2 * | 4/2010 | Li | G06F 17/30616 707/673 |
| 7,856,350 | B2 * | 12/2010 | Zhou | G06F 17/2785 704/9 |
| 8,983,969 | B2 * | 3/2015 | Basak | G06F 17/30424 707/748 |

(Continued)

OTHER PUBLICATIONS

Manning et al., "Introduction to Information Retrieval," Chapters 6, 11, and 12,Cambridge University Press, 2009, 58 pages.

(Continued)

*Primary Examiner* — Michelle Owyang
(74) *Attorney, Agent, or Firm* — Cantor Colburn LLP

(57) ABSTRACT

According to an aspect, a question answering computer system determines a set of search terms for a given question. A plurality of passages that each includes at least one search term in the set of search terms is identified in response to a search of a document for search terms in the set of search terms. A passage from the plurality of passages is selected. A context based score of the selected passage that indicates the likelihood that the selected passage contains an answer to the question is generated based on criteria that specify a relationship among the set of search terms, content of the passage, and content of at least one other passage in the plurality of passages.

14 Claims, 4 Drawing Sheets

(56) References Cited

U.S. PATENT DOCUMENTS

| | | | |
|---|---|---|---|
| 8,990,246 B2* | 3/2015 | Donmez | 707/771 |
| 2008/0201132 A1* | 8/2008 | Brown | G06F 17/30654 704/9 |
| 2008/0263022 A1* | 10/2008 | Kostorizos | G06F 17/30864 |
| 2009/0287678 A1* | 11/2009 | Brown | G06F 17/30654 |
| 2011/0016081 A1* | 1/2011 | Basak | G06F 17/30424 707/603 |
| 2011/0125734 A1* | 5/2011 | Duboue | G09B 7/00 707/723 |
| 2011/0320452 A1* | 12/2011 | Kawai | G06F 17/30882 707/737 |
| 2012/0078926 A1 | 3/2012 | Chu-Carroll et al. | |
| 2012/0254161 A1 | 10/2012 | Zhang et al. | |
| 2013/0007033 A1* | 1/2013 | Brown | G06F 17/30654 707/764 |
| 2015/0317313 A1* | 11/2015 | Lv | G06F 17/3053 707/730 |
| 2016/0098477 A1* | 4/2016 | Berajawala | G06F 17/30675 707/727 |
| 2016/0224663 A1 | 8/2016 | Nolan et al. | |

OTHER PUBLICATIONS

List of IBM Patents or Patent Applictions Treated as Related; (Appendix P), Filed Nov. 11, 2016, 2 pages.
Christopher M. Nolan, et al., Pending U.S. Appl. No. 15/349,155 entitled "Context Based Passage Retreival and Scoring in a Question Answering System," filed Nov. 11, 2016.

* cited by examiner

CONTEXT BASED PASSAGE RETRIEVAL AND SCORING IN A QUESTION ANSWERING SYSTEM

BACKGROUND

The present disclosure relates generally to a question answering computer system, and more specifically, to a context based approach to passage retrieval and scoring in a question answering computer system.

An information retrieval computer system typically receives a query, identifies keywords in the query, searches documents for the keywords, and ranks results of the searching to identify best matches. Some information retrieval computer systems output a list of best matching results to a user, such that the user can then attempt to determine if desired information can be found in the results. Keyword searching often uses frequency-based scoring for words or synonyms, but such searches typically fail to consider the context of particular words. More advanced question answering computer systems typically employ natural-language processing (NLP) that returns a highest scoring answer to a question in a natural language format. NLP techniques, which are also referred to as text analytics, infer the meaning of terms and phrases by analyzing their syntax, context, and usage patterns.

Human language is so complex, variable (there are many different ways to express the same meaning), and polysemous (the same word or phrase may mean many things in different contexts) that NLP presents an enormous technical challenge. Decades of research have led to many specialized techniques each operating on language at different levels and on different isolated aspects of the language understanding task. These techniques include, for example, shallow parsing, deep parsing, information extraction, word-sense disambiguation, latent semantic analysis, textual entailment, and co-reference resolution. None of these techniques is perfect or complete in their ability to decipher the intended meaning. Unlike programming languages, human languages are not formal mathematical constructs. Given the highly contextual and implicit nature of language, humans themselves often disagree about the intended meaning of any given expression.

A question answering computer system can use a primary search to retrieve documents, passages and other types of information (from both structured, e.g., a knowledgebase, and unstructured sources), with respect to a query formulated from a given question, which are later used for candidate answer generation. Candidate answers can then be evaluated with respect to candidate passage evidence that supports or refutes the candidate answer. Contemporary passage scorers use various techniques to judge candidate passages independently of each other, including methods based on surface similarity (i.e. textual alignment) with the question, logical form alignment, structural similarity based on syntactic-semantic graphs, various linguistic features, etc.

SUMMARY

Embodiments include a method, system, and computer program product for context based passage retrieval and scoring in a question answering computer system. In one aspect, a question answering computer system determines a set of search terms for a given question. A plurality of passages that each includes at least one search term in the set of search terms is identified in response to a search of a document for search terms in the set of search terms. A passage from the plurality of passages is selected for scoring. A context based score of the selected passage that indicates a likelihood that the selected passage contains an answer to the question is generated based on criteria that specify a relationship among the set of search terms, content of the passage, and content of at least one other passage in the plurality of passages Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
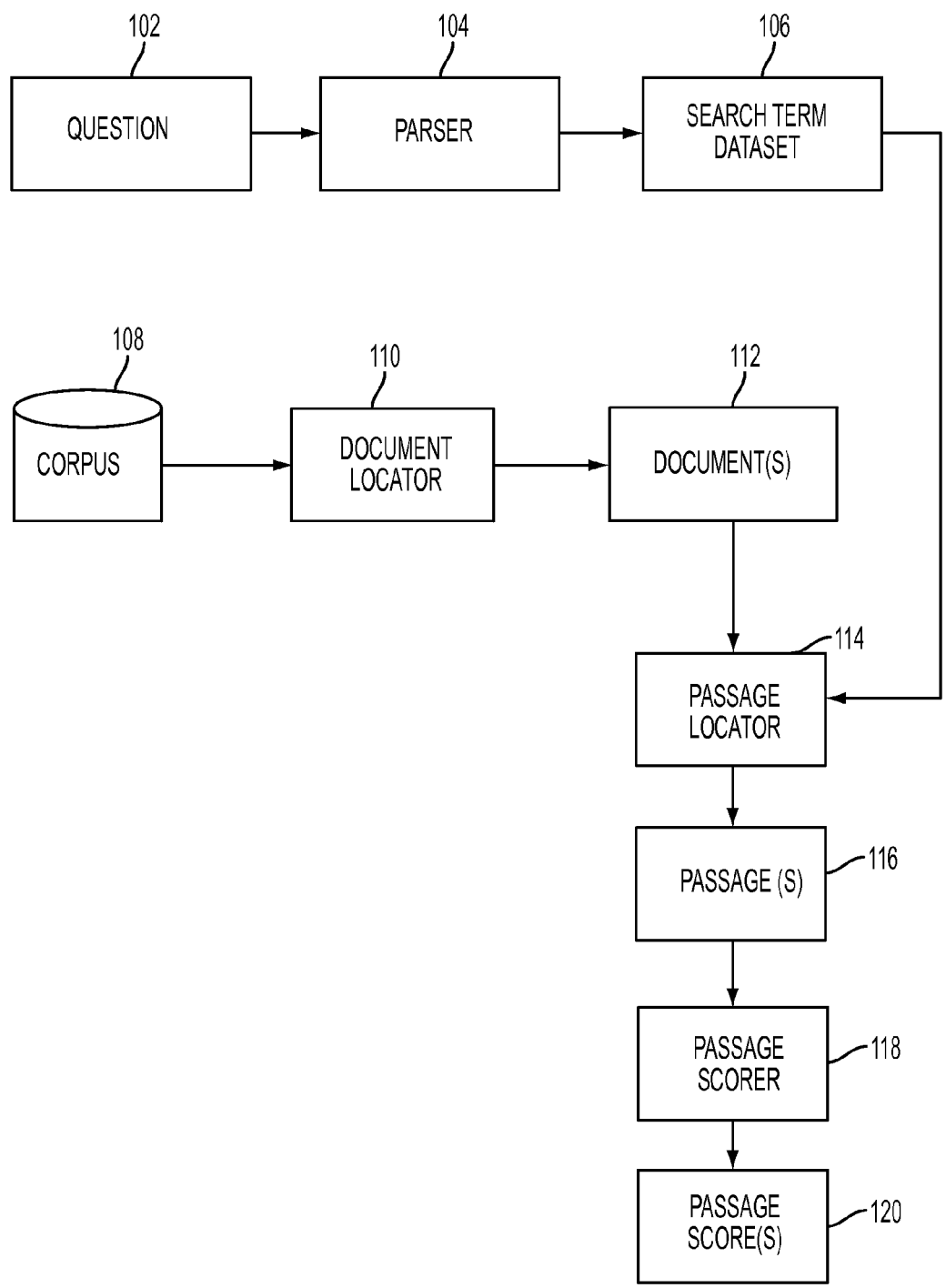
FIG. 1 depicts a block diagram of a dataflow for context based passage retrieval and scoring in a question answering computer system in accordance with an embodiment.

Embodiments disclosed herein relate to a context based approach to passage retrieval in question answering computer systems that scores a selected passage by taking into account content of other passages that are proximate to the selected passage. The term "passage" is used herein to refer to a portion of text such as, but not limited to, one to three sentences or a paragraph.

Text retrieval, or primary search, is an early phase in question answering architectures. This phase includes searching a knowledge base for passages of text which potentially contain the answer to a given question and assigning them a relevancy score. There are several approaches to this task of text retrieval such as those described in the article "*Finding needles in the haystack: Search and candidate generation*", by Chu-Carroll et al., IBM Journal of Research and Development, Volume 56 May/July 2012; and in Chapters 6, 11, and 12 of the book *Introduction to Information Retrieval*, by Christopher D. Manning et al., 2009, Cambridge University Press. A drawback to these existing approaches is that their scoring of candidate passages does not take advantage of information preceding the passages in the text, as each passage within a document is scored independently of other passages in the document.

Embodiments described herein can take into account content of passages that are proximate to a given passage when determining a score for the given passage. Much of the data that is searched by question answering computer systems takes on one of two forms: a narrative or a hierarchy. Books and news articles frequently take the form of a narrative, where one idea flows from the next. As such, the ideas in one sentence tend to build upon those in the preceding sentence, and ideas in one paragraph tend to build upon those in the preceding paragraph. In more structured documents, like Encyclopedia or Wikipedia articles, data is frequently presented in a more hierarchical form: subsections are about the title and the summary, paragraphs are about the subsection heading, and those paragraphs and sentences tend to build upon preceding ones within a section. In both cases, looking at preceding text in the document results in more information that builds up to the current sentence. This preceding text can lend context to the current passage. Without this context, passages that are likely to contain the correct answer but have few search terms, may be scored lower than passages that are less likely to contain the right answer but have more search terms.

For example, if the given question is "Who were witnesses during the Robert Blake murder trial?", and the document under consideration is an article in Wikipedia titled "Robert Blake (actor)", an opening sentence, or passage, containing "Robert Blake is an American actor . . . " will likely score higher using existing passage scoring algorithms than a more relevant sentence, or passage, that includes " . . . two key prosecution witnesses, Ronald "Duffy" Hambleton and Gary McLarty . . . ". This is because the terms "Robert" and "Blake" are both likely to be less frequent in the knowledge base than the term "witness", and therefore will be considered to be more informative. Also, the proximity of the terms "Robert" and "Blake" in both the question and the passage may also increase the score of the passage.

Basic contemporary passage scoring that can be used by existing systems is as follows:
Find the n documents D in a corpus of documents most likely to contain the answer to the question;
  For document d in D:
  Find all passages P that contain any search term;
  For passage p in P:
  Score p;
  Combine the score of p to that of d Other contemporary passage scoring algorithms include, but are not limited to models that utilize a vector space, BM25, and a query likelihood. In addition, contemporary passage scorers use various techniques to judge candidate passages independently of each other, including, but not limited to processes based on surface similarity (i.e. textual alignment) with the question, logical form alignment, structural similarity based on syntactic-semantic graphs, and various linguistic features. These contemporary passage scoring algorithms score each passage individually and do not take into account content of other passages that are proximate to the selected passage.

Many documents represent a hierarchy of concepts, whether explicitly or implicitly. For example, the document referenced above is about Robert Blake. The contents in it, by and large, pertain to him. Within the document there can be sections on his early life, his acting career, his murder trial, etc. Each of those sections can contain concept oriented paragraphs and each paragraph is made up of sentences representing basic ideas. Embodiments of context based passage scoring described herein can take into account preceding passages in order to determine that the passage contains correct answers. This allows the passage scorer to correctly score the passage containing the answer higher than the one that does not. Embodiments of context based scoring described herein can also take into account closely following passages in order to determine that the passage contains correct answers. In this manner, context based scoring can be based on criteria that specify a relationship among the set of search terms, content of the passage, and content of at least one other passage in the plurality of passages.

Turning now to FIG. 1, a block diagram of a dataflow for context based passage retrieval and scoring in a question answering computer system is generally shown in accordance with an embodiment. The dataflow shown in FIG. 1 includes a question 102 input to a document locator 110. The document locator 110 uses the question 102 to identify documents 112 that are most likely to contain the answer to the question 102. In an embodiment, such as that shown in FIG. 1, the documents searched by the document locator 110 can be located in a corpus 108. In an embodiment, the document locator 110 performs processes such as, but not limited to: open source projects such as Lucene or Indri, commercial solutions such as Bing, or home-grown solutions utilizing a scoring or ranking algorithm(s) such as those described in Chapters 6, 11, and 12 of the book *Introduction to Information Retrieval*, by Christopher D. Manning et al., 2009, Cambridge University Press.

The dataflow shown in FIG. 1 also shows the question 102 being input to a parser 104 which outputs a search term dataset 106. In an embodiment, the parser 104 utilizes natural-language processing (NLP) to extract search terms. The search term dataset 106 is output from the parser 104 includes a list of search terms that are used by the passage locator 114 to locate passages 116 in the documents 112 that contain any of the search terms. As shown in the embodiment of FIG. 1, the passages 116 are input to a passage scorer 118 which outputs passage scores 120 associated with the passages 116. An embodiment, of the passage scorer 118 that takes passage context into account when scoring is shown in FIG. 2.

Figure 2:
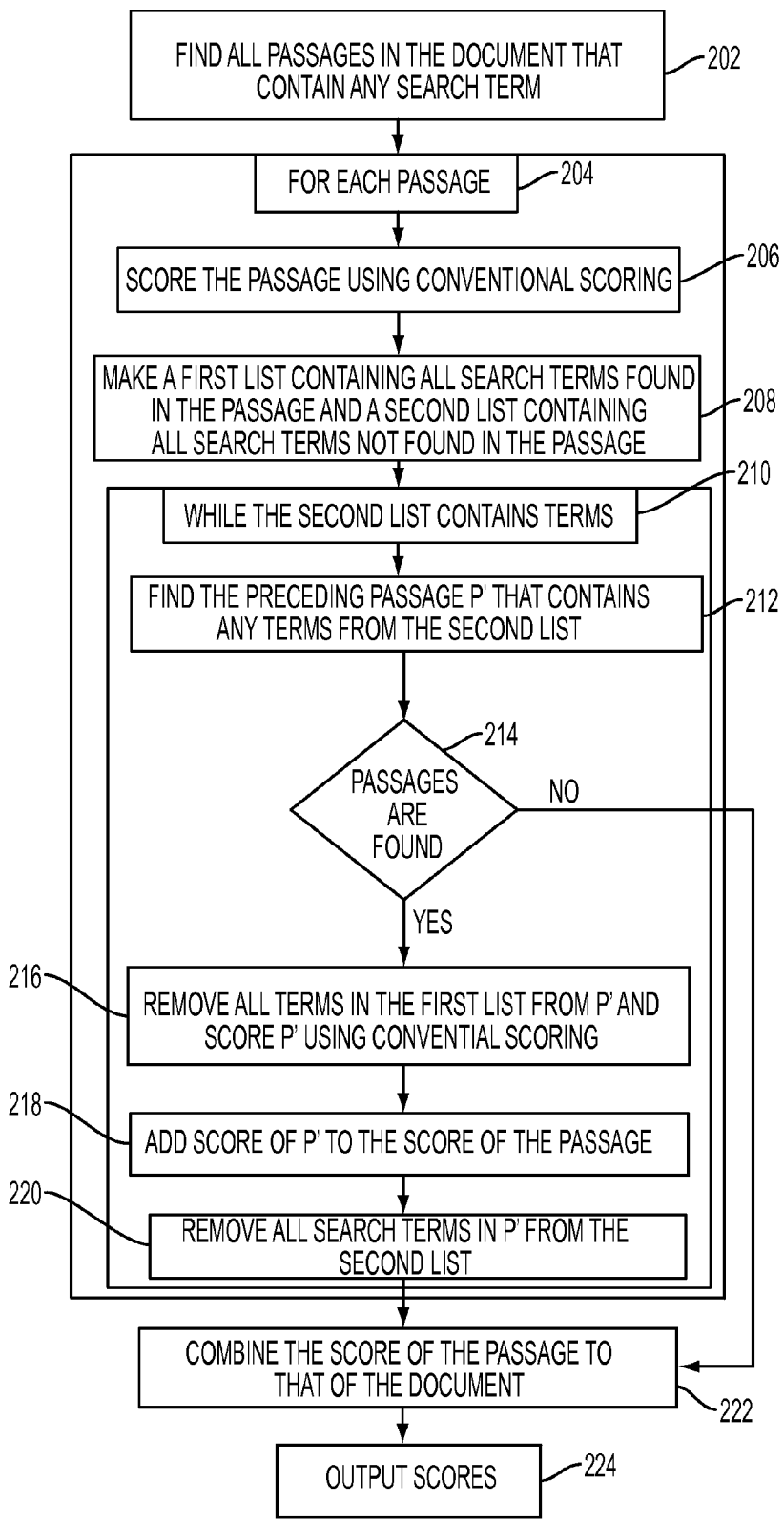
FIG. 2 depicts a process flow of a process for context based passage retrieval and scoring in a question answering computer system in accordance with an embodiment.

Turning now to FIG. 2, a block diagram of a process for context based passage retrieval in a question answer computer system is generally shown in accordance with an embodiment. The processing shown in FIG. 2 can be performed for each of the documents 112 identified by the document locator 110 based on a given question 102 and its search term dataset 106. At block 202, passages 116 in a document that contain any search term in the search term dataset 106 are identified.

Processing continues at block 204, where blocks 206 through 222 are performed for each of the passages 116 that contain a search term. At block 206, the selected passage is scored using a conventional scoring method such as one of those described above. At block 208, two lists are created, a first list (also referred to as a first subset) containing search terms in the search term dataset 106 that were found in the selected passage and a second list (also referred to as a second subset) containing the search terms in the search term dataset 106 that were not found in the selected passage.

Processing continues at block 210, where blocks 210 through 220 are performed while the second list created at block 208 contains search terms and there are still preceding passages in the document that have not been analyzed. At block 212, a passage that precedes the selected passage and contains any search terms from the second list (search terms not found in the selected passage) is searched for in the document. In an embodiment, an indicator is maintained that tracks a current preceding passage location and block 212 looks back one passage at a time in the document looking for a preceding document with a search term from the second list. For example, if the selected passage is the $5^{th}$ passage in the document that contains search terms in the search term dataset 106, then the processing in block 212 first looks to the $4^{th}$ passage to see if it contains a search term from the second list, then to the $3^{rd}$ passage, followed by the $2^{nd}$ passage and finally the $1^{st}$ passage. Once a preceding passage (P') is found that contains at least one search term from the second list, as determined at block 214, then processing continues at block 216. When no preceding passage is located that contains at least one search term from the second list, as determined at block 214, then processing for the selected passage is complete and processing continues at block 222.

Referring to FIG. 2, at block 216, all of the search terms from the first list (search terms found in the selected passage) are removed from P'. P' minus the search terms in the first list is then scored using a conventional scoring method such as one of those described above. At block 218, the score of P' is combined, or aggregated, with the score of the selected passage by adding the score of P' to the current score of the selected passage. Other manners of the combining the score of P' to the selected passage can be used such as, but not limited to: 1) the score of P' down weighted by some constant (P=P+P'*0.5); 2) the score of P' decayed according to distance (P=P+P'*(1/log(distance)) or P=P*(1/(2^distance)) where distance can be the number of words or the number of passages between P and P'; and 3) a combination of 1 and 2. In this manner, context based scoring can generate a score for the selected passage based on criteria that specify a relationship among the set of search terms, content of the selected passage, and content of at least one other passage in the document.

At block 220, all of the search terms in located in P' are removed from the second list. If there are still terms in the second list, then processing continues at block 212, otherwise processing continues at block 222. At block 222, the score of the passage can be combined with the score of the document. At block 224, the score for the passage and/or the score for the document can be output.

A simplified example of the processing shown in FIG. 2 follows:
  Question 102: Who were the witnesses at Robert Blake murder trial?
  Search term dataset 106: {witness, Robert, Blake, murder, trial}
  Document 112: newspaper article from the corpus 108
  Score=1
  Term weights: Robert:2, Blake:2, murder:1.25, trial:1.25, witness:1
  Find all passages (P) 116 in the document that contain any search terms in the search term dataset 106:
  Robert Blake was accused and arrested for the murder of his wife in 2005. (p1)
  He was arrested for murder at his home in Malibu. (p2)
  Witnesses at the murder trial included his neighbors from Malibu. (p3)
  Perform blocks 206-222 of FIG. 2 for each passage p1, p2, p3 in P:
  For passage p1:
  p1: Robert Blake was accused and arrested for the murder of his wife in 2005.
  Score p1 in conventional manner (Robert+Blake) (4=2+2)
  First list (L1): Robert, Blake, murder
  Second list (L2): witness, trial
  No preceding passages
  Combine score of p1 with a score of the document (5=4+1)
  Go to next passage, p2:
  p2: He was arrested for murder at his home in Malibu.
  Score p2 in conventional manner_(murder)(1.25)
  First list (L1): murder
  Second list (L2): Robert, Blake, witness, trial
  P'=p1: Robert Blake was accused and arrested for the murder of his wife in 2005.
  p1': Robert Blake was accused and arrested for the X of his wife in 2005.
  Score p1' in conventional manner and add this score (e.g., in a decayed manner) to the score of p2 (~4.296=1.25+((2+2)*(1/ln(1+e))))
  Second list (L2): witness, trial
  No preceding passages
  Combine score of p2 with a score of the document (5.296=4.296+1)
  Go to next passage, p3:
  p3: Witnesses at the murder trial included his neighbors from Malibu.
  Score p3 in conventional manner (witness+murder+trial) (3.5=1+1.25+1.25)
  First list (L1): witness, murder, trial
  Second list (L2): Robert, Blake
  P'=p2: He was arrested for murder at his home in Malibu. No terms from L2
  P'=p1: Robert Blake was accused and arrested for the murder of his wife in 2005.
  p1': Robert Blake was accused and arrested for the X of his wife in 2005.
  Score p1' in conventional manner and add this score to score of p3 (~6.08=3.5+((2+2)*(1/ln(2+e))))
  Second list (L2): null
  Combine score of p3 with a score of the document (7.08=6.08+1)

In this example, there are no more passages in the document having any search terms in the search term dataset 106. The context based scores of each of the passages and/or the cumulative context based score of the document can then be output as shown at block 224 of FIG. 2.

As shown in this example, without context based scoring, the score of the document would be 1.0, the score of p1 would be 5, the score of p2 would be 2.25 and the score of p3 would be 4.5. Using a process, such as that shown in FIG. 2 to perform context based scoring results in a p1 score of 5, a p2 score of 5.296, a p3 score of 7.08, and a document score of 1.0. The scores produced by context based scoring, which are based on criteria that specify a relationship among search terms found in the selected passage and search terms found in other passages, more accurately reflect the likelihood of a selected passage containing the answer to the question.

The examples of scoring shown in the above example are intended only to illustrate how a passage score can take into account contents of preceding passages. In practice, different and more complex scoring methodologies known in the art can be used by embodiments to score the passage while taking into account contents of preceding passages.

Embodiments are not limited to looking to preceding passages for context based scoring as embodiments can also look to passages that follow a selected passage to perform context based scoring.

A number of computational improvements in accuracy and efficiency can be observed in question answering computer systems that incorporate embodiments of context based passage retrieval and scoring as disclosed herein. Since context based passage scoring can more accurately reflect a likelihood of a passage answering a given question, the number of passages evaluated by the computer system can be reduced, thus resulting in a reduction in total processing time and resource utilization as compared to evaluating a larger number of passages and documents to find those likely to contain an answer to the given question.

Figure 3:
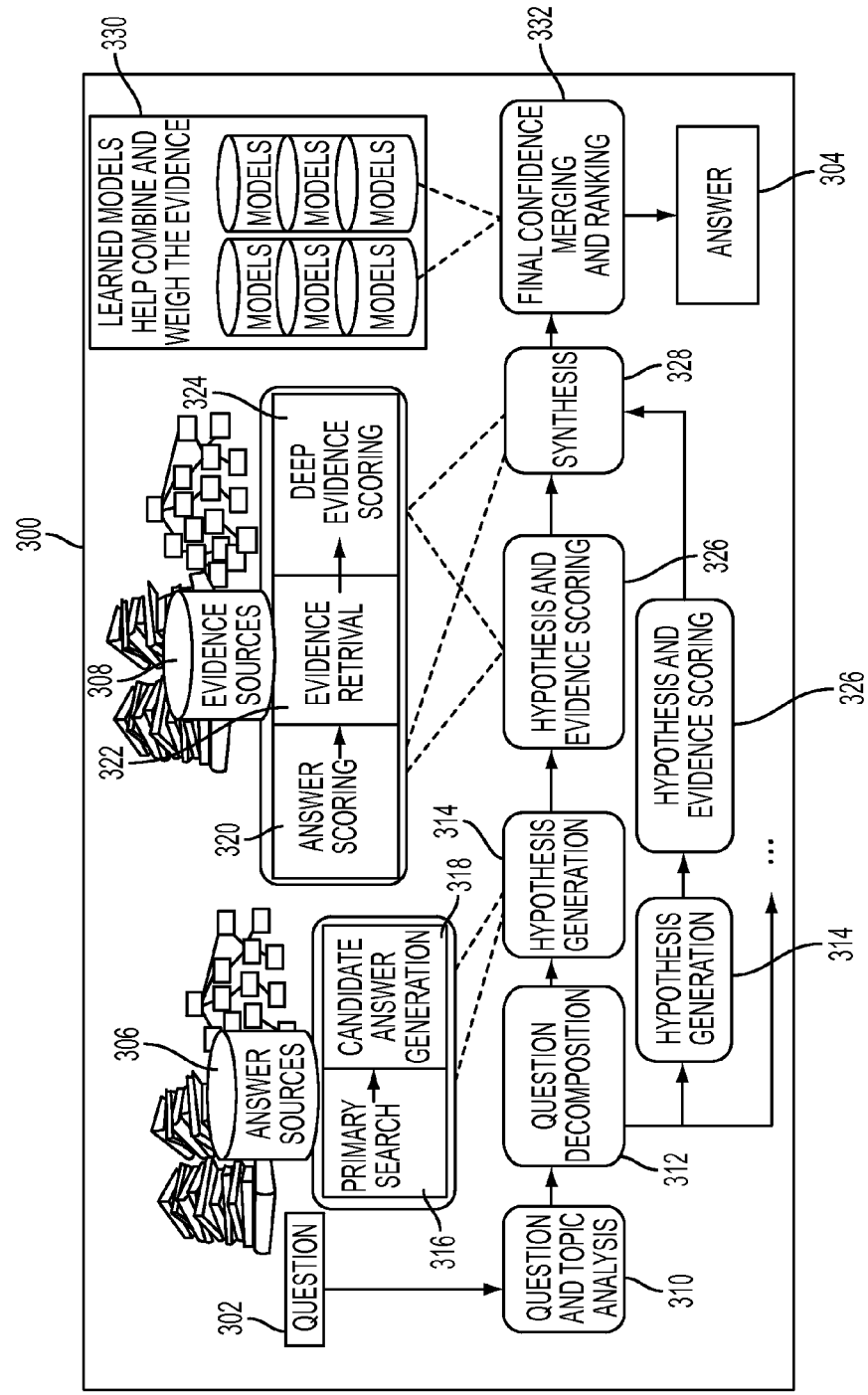
FIG. 3 depicts a high-level block diagram of a question-answer (QA) framework where embodiments of identifying salient terms for passage justification can be implemented in accordance with an embodiment.

Turning now to FIG. 3, a high-level block diagram of a question-answer (QA) framework 300 where embodiments described herein can be utilized is generally shown.

The QA framework 300 can be implemented to generate a ranked list of answers 304 (and a confidence level associated with each answer) to a given question 302. In an embodiment, general principles implemented by the framework 300 to generate answers 304 to questions 302 include massive parallelism, the use of many experts, pervasive confidence estimation, and the integration of shallow and deep knowledge. In an embodiment, the QA framework 300 shown in FIG. 3 is implemented by the Watson™ product from IBM.

The QA framework 300 shown in FIG. 3 defines various stages of analysis in a processing pipeline. In an embodiment, each stage admits multiple implementations that can produce alternative results. At each stage, alternatives can be independently pursued as part of a massively parallel computation. Embodiments of the framework 300 don't assume that any component perfectly understands the question 302 and can just look up the right answer 304 in a database. Rather, many candidate answers can be proposed by searching many different resources, on the basis of different interpretations of the question (e.g., based on a category of the question.) A commitment to any one answer is deferred while more and more evidence is gathered and analyzed for each answer and each alternative path through the system.

As shown in FIG. 3, the question and topic analysis 310 is performed and used in question decomposition 312. Hypotheses are generated by the hypothesis generation block 314 which uses input from the question decomposition 312, as well as data obtained via a primary search 316 through the answer sources 306 and candidate answer generation 318 to generate several hypotheses. Hypothesis and evidence scoring 326 is then performed for each hypothesis using evidence sources 308 and can include answer scoring 320, evidence retrieval 322 and deep evidence scoring 324.

A synthesis 328 is performed of the results of the multiple hypothesis and evidence scorings 326. Input to the synthesis 328 can include answer scoring 320, evidence retrieval 322, and deep evidence scoring 324. Learned models 330 can then be applied to the results of the synthesis 328 to generate a final confidence merging and ranking 332. A ranked list of answers 304 (and a confidence level associated with each answer) is then output.

The framework 300 shown in FIG. 3 can utilize embodiments of context based passage retrieval and scoring as part of performing the primary search 316. As shown in the framework 300, the primary search 316 (also referred to as text retrieval) is an early phase of the question answering process. The primary search 316 can include searching a corpus or knowledge base of answer sources 506 for passages of text which potentially contain the answer to a given question and assigning relevancy score to those passages.

Figure 4:
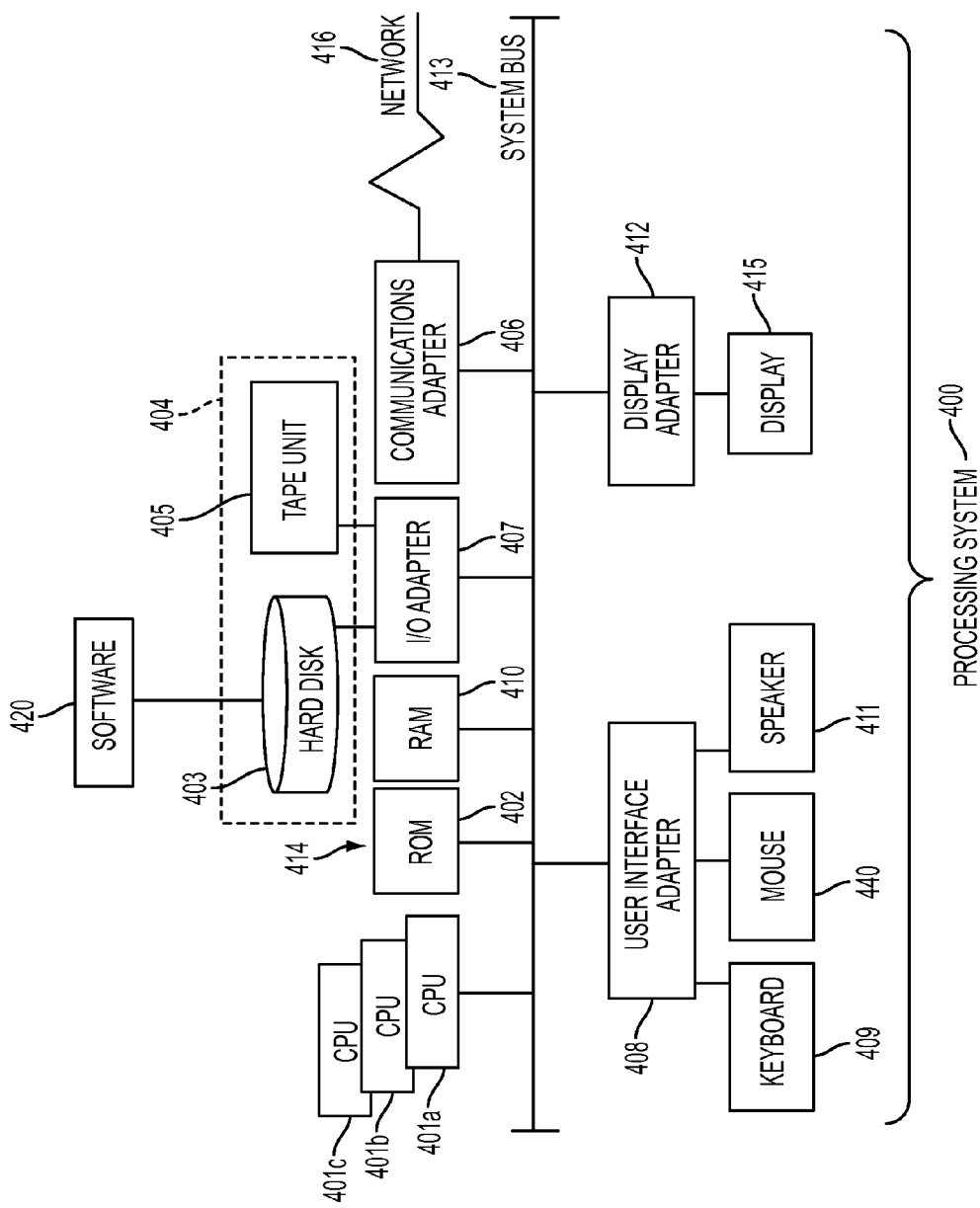
FIG. 4 depicts a processing system in accordance with an embodiment.

Referring now to FIG. 4, there is shown an embodiment of a processing system 400 for implementing the teachings herein. The processing system 400 is an example of a question answering computer system as previously referenced herein. In this embodiment, the processing system 400 has one or more central processing units (processors) 401a, 401b, 401c, etc. (collectively or generically referred to as processor(s) 401). Processors 401, also referred to as processing circuits, are coupled to system memory 414 and various other components via a system bus 413. Read only memory (ROM) 402 is coupled to system bus 413 and may include a basic input/output system (BIOS), which controls certain basic functions of the processing system 400. The system memory 414 can include ROM 402 and random access memory (RAM) 410, which is read-write memory coupled to system bus 413 for use by processors 401.

FIG. 4 further depicts an input/output (I/O) adapter 407 and a network adapter 406 coupled to the system bus 413. I/O adapter 407 may be a small computer system interface (SCSI) adapter that communicates with a hard disk 403 and/or tape storage drive 405 or any other similar component. I/O adapter 407, hard disk 403, and tape storage drive 405 are collectively referred to herein as mass storage 404. Software 420 for execution on processing system 400 may be stored in mass storage 404. The mass storage 404 is an example of a tangible storage medium readable by the processors 401, where the software 420 is stored as instructions for execution by the processors 401 to perform a method, such as the process flow 200 of FIG. 2. Network adapter 406 interconnects system bus 413 with an outside network 416 enabling processing system 400 to communicate with other such systems. A screen (e.g., a display monitor) 415 is connected to system bus 413 by display adapter 412, which may include a graphics controller to improve the performance of graphics intensive applications and a video controller. In one embodiment, adapters 407, 406, and 412 may be connected to one or more I/O buses that are connected to system bus 413 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 413 via user interface adapter 408 and display adapter 412. A keyboard 409, mouse 440, and speaker 411 can be interconnected to system bus 413 via user interface adapter 408, which may include, for example, a Super I/O chip integrating multiple device adapters into a single integrated circuit.

Thus, as configured in FIG. 4, processing system 400 includes processing capability in the form of processors 401, and, storage capability including system memory 414 and mass storage 404, input means such as keyboard 409 and mouse 440, and output capability including speaker 411 and display 415. In one embodiment, a portion of system memory 414 and mass storage 404 collectively store an operating system such as the AIX® operating system from IBM Corporation to coordinate the functions of the various components shown in FIG. 4.

Technical effects and benefits include context based passage retrieval and scoring in a question answering computer system to increase processing efficiency and reduce latency. Once passages are retrieved and scored based on their context, these scores can be used in one or more portions of a computerized question answering process to reduce a number of passages analyzed in detail and improve accuracy of computer-generated results.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   determining, by a question answering computer system, a set of search terms based on a given question;
   searching, by the question answering computer system, a document using the set of search terms;
   identifying, by the question answering computer system, a plurality of passages in the document in response to the searching, each of the plurality of passages including at least one search term in the set of search terms;
   selecting, by the question answering computer system, a passage from the plurality of passages; and
   generating, by the question answering computer system, a context based score of the selected passage that indicates a likelihood that the selected passage contains an answer to the question, the generating based on criteria that specify a relationship among the set of search terms, content of the passage, and content of at least one other passage in the plurality of passages comprising:
      calculating a first score based on the content of the selected passage and a first subset of the set of search terms, the content of the selected passage including the first subset;
      creating a list containing a second subset of the set of search terms, the second subset is different than the first subset and is not included in the content of the selected passage;
      performing repeatedly until the list is empty:
         determining whether there is at least one other passage in the plurality of passages;
         selecting one of the at least one other passage in response to determining that there is at least one other passage in the plurality of passages, the one of the at least one other passage contains at least one search term in the list, the selecting is performed in an order of closest proximity to the selected passage in the document;
         generating a second score by scoring the one of the at least one other passage based on the at least one search term in the list that is contained in the one of the at least one other passage, and removal of the first subset from the at least one other passage;
         updating the second score based on a distance in the document between the selected passage and the at least one other passage;
         aggregating the first score and the updated second score by adding the first score to the updated second score to generate the context based score; and
         in response to the adding, updating the list by removing from the list all search terms, including the at least one search term, contained in the at least one other passage.

2. The method of claim 1, wherein the at least one other passage precedes the selected passage in the document.

3. The method of claim 1, wherein the at least one other passage follows the selected passage in the document.

4. The method of claim 1, wherein the generating a context based score is further based on at least one of a vector space model, a BM25 model, and a query likelihood model.

5. The method of claim 1, wherein the document contains unstructured content that is organized in one of a narrative form and a hierarchy form.

6. A computer program product comprising:
   a tangible storage medium readable by a processing circuit of a question answering computer system and storing instructions for execution by the processing circuit to perform a method comprising:
   determining, by the question answering computer system, a set of search terms based on a given question;
   searching, by the question answering computer system, a document using the set of search terms;
   identifying, by the question answering computer system, a plurality of passages in the document in response to the searching, each of the plurality of passages including at least one search term in the set of search terms;
   selecting, by the question answering computer system, a passage from the plurality of passages; and
   generating, by the question answering computer system, a context based score of the selected passage that indicates a likelihood that the selected passage contains an answer to the question, the generating based on criteria that specify a relationship among the set of search terms, content of the passage, and content of at least one other passage in the plurality of passages comprising:
      calculating a first score based on the content of the selected passage and a first subset of the set of search terms, the content of the selected passage including the first subset;
      creating a list containing a second subset of the set of search terms, the second subset is different than the first subset and is not included in the content of the selected passage;
      performing repeatedly until the list is empty:
         determining whether there is at least one other passage in the plurality of passages;
         selecting one of the at least one other passage in response to determining that there is at least one other passage in the plurality of passages, the one of the at least one other passage contains at least one search term in the list, the selecting is performed in an order of closest proximity to the selected passage in the document;
         generating a second score by scoring the one of the at least one other passage based on the at least one search term in the list that is contained in the one of the at least one other passage, and removal of the first subset from the at least one other passage;
         updating the second score based on a distance in the document between the selected passage and the at least one other passage;
         aggregating the first score and the updated second score by adding the first score to the updated second score to generate the context based score; and in response to the adding, updating the list by removing from the list all search terms, including the at least one search term, contained in the at least one other passage.

7. The computer program product of claim 6, wherein the at least one other passage precedes the selected passage in the document.

8. The computer program product of claim 6, wherein the at least one other passage follows the selected passage in the document.

9. The computer program product of claim 6, wherein the generating a context based score is further based on at least one of a vector space model, a BM25 model, and a query likelihood model.

10. The computer program product of claim 6, wherein the document contains unstructured content that is organized in one of a narrative form and a hierarchy form.

11. A system comprising:
a memory having computer readable instructions; and
a processor for executing the computer readable instructions, the computer readable instructions including:
determining a set of search terms based on a given question;
searching a document using the set of search terms;
identifying a plurality of passages in the document in response to the searching, each of the plurality of passages including at least one search term in the set of search terms;
selecting a passage from the plurality of passages; and
generating, by the question answering computer system, a context based score of the selected passage that indicates a likelihood that the selected passage contains an answer to the question, the generating based on criteria that specify a relationship among the set of search terms, content of the passage, and content of at least one other passage in the plurality of passages comprising:
calculating a first score based on the content of the selected passage and a first subset of the set of search terms, the content of the selected passage including the first subset;
creating a list containing a second subset of the set of search terms, the second subset is different than the first subset and is not included in the content of the selected passage;
performing repeatedly until the list is empty:
determining whether there is at least one other passage in the plurality of passages;
selecting one of the at least one other passage in response to determining that there is at least one other passage in the plurality of passages, the one of the at least one other passage contains at least one search term in the list, the selecting is performed in an order of closest proximity to the selected passage in the document;
generating a second score by scoring the one of the at least one other passage based on the at least one search term in the list that is contained in the one of the at least one other passage, and removal of the first subset from the at least one other passage;
updating the second score based on a distance in the document between the selected passage and the at least one other passage;
aggregating the first score and the updated second score by adding the first score to the updated second score to generate the context based score; and
in response to the adding, updating the list by removing from the list all search terms, including the at least one search term, contained in the at least one other passage.

12. The system of claim 11, wherein the at least one other passage precedes the selected passage in the document.

13. The system of claim 11 wherein the at least one other passage follows the selected passage in the document.

14. The system of claim 11, wherein the generating a context based score is further based on at least one of a vector space model, a BM25 model, and a query likelihood model.

* * * * *